(12) United States Patent
Sargeant et al.

(10) Patent No.: US 12,251,908 B2
(45) Date of Patent: Mar. 18, 2025

(54) CONTROLLED DENSITY THERMOPLASTIC MULTILAYER FILMS

(71) Applicant: FLEX FILMS (USA) INC., Elizabethtown, KY (US)

(72) Inventors: Steven Sargeant, Elizabethtown, KY (US); David Ortiz-Grob, Elizabethtown, KY (US); Dakota Goodman, Eastview, KY (US)

(73) Assignee: FLEX FILMS (USA) INC., Elizabethtown, KY (US)

( * ) Notice: Subject to any disclaimer, the term of this patent is extended or adjusted under 35 U.S.C. 154(b) by 80 days.

(21) Appl. No.: 17/632,902

(22) PCT Filed: Aug. 5, 2020

(86) PCT No.: PCT/US2020/044959
§ 371 (c)(1),
(2) Date: Feb. 4, 2022

(87) PCT Pub. No.: WO2021/026204
PCT Pub. Date: Feb. 11, 2021

(65) Prior Publication Data
US 2022/0266576 A1     Aug. 25, 2022

Related U.S. Application Data

(60) Provisional application No. 62/882,821, filed on Aug. 5, 2019.

(51) Int. Cl.
*B32B 27/08* (2006.01)
*B32B 27/20* (2006.01)
(Continued)

(52) U.S. Cl.
CPC ............ *B32B 27/08* (2013.01); *B32B 27/205* (2013.01); *B32B 27/325* (2013.01); *B32B 27/36* (2013.01);
(Continued)

(58) Field of Classification Search
None
See application file for complete search history.

(56) References Cited

U.S. PATENT DOCUMENTS

| 6,326,431 B1 | 12/2001 | Peiffer et al. |
| 2007/0026223 A1* | 2/2007 | Osada ................. H01M 50/133 428/480 |

(Continued)

FOREIGN PATENT DOCUMENTS

JP     2018030901 A     3/2018

OTHER PUBLICATIONS

International Search Report and Written opinion dated Sep. 29, 2020 pertaining to PCT Application No. PCT/US2020/044959 filed Aug. 5, 2020.

(Continued)

*Primary Examiner* — Chinessa T. Golden
(74) *Attorney, Agent, or Firm* — Dinsmore & Shohl LLP

(57) ABSTRACT

The biaxially oriented multilayered films include a stack $(A-B)_n$ of n layer units A-B, where n is greater than or equal to 32 each layer unit A-B having individual layers comprising a first layer A and a second layer B overlying the first layer A. The biaxially oriented multilayer films include intralayer voids within a portion of the individual layers in the stack. The intralayer voids have width-to-height aspect ratios from 20:1 to 500:1. The first layers of the layer units have a first composition, and the second layers of the layer units have a second composition. The first composition includes a first thermoplastic and a first polymer immiscible (Continued)

with the first thermoplastic. The second composition includes a second thermoplastic that may be the same as or different from that of the first thermoplastic.

13 Claims, 3 Drawing Sheets

(51) Int. Cl.
 *B32B 27/32* (2006.01)
 *B32B 27/36* (2006.01)
(52) U.S. Cl.
 CPC ....... *B32B 2250/05* (2013.01); *B32B 2250/24* (2013.01); *B32B 2307/518* (2013.01)

(56) References Cited

U.S. PATENT DOCUMENTS

2010/0285302 A1  11/2010  Yoshida et al.
2012/0100363 A1   4/2012  Yamamoto et al.

OTHER PUBLICATIONS

English Translation of Indonesia Office Action dated May 31, 2023, pertaining to ID Patent Application No. P00202201469, 6 pgs.
Japanese Office Action dated Mar. 26, 2024, pertaining to JP Patent Application No. 2022-507401, 3 pgs.
India Examination Report dated Aug. 13, 2024, pertaining to IN Patent Application No. 202237006344, 6 pgs.
United Arab Emirates Search Report dated Oct. 13, 2024, pertaining to AE Patent Application No. P6000211/22, 8 pgs.

* cited by examiner

CONTROLLED DENSITY THERMOPLASTIC MULTILAYER FILMS

CROSS REFERENCE TO RELATED APPLICATION

This application is a National Stage Entry under 35 U.S.C. § 371 of International Application No. PCT/US2020/044959, filed Aug. 5, 2020 and entitled "Controlled Density Thermoplastic Multilayer Films," which claims the benefit of priority under 35 U.S.C. § 120 of U.S. Provisional Application No. 62/882,821, entitled "Controlled Density Thermoplastic Multilayer Films," filed Aug. 5, 2019, the entire contents of both of which are hereby incorporated by reference in the present disclosure.

BACKGROUND

Embodiments of the present disclosure generally relate to biaxially oriented multilayer films and, more specifically, to biaxially orientated multilayer films that exhibit lower densities and improved transparency.

Thermoplastic filmic materials are well known in the art. Such materials are commonly used in the construction of flexible packaging, solar control window films, substrates for electronics manufacture and a host of other significant and valuable uses. Manufacturers have actively pursued the production of substantial commercial quantities of these plastic materials due to performance and cost advantages afforded by the technology.

Polymers and resins used to manufacture such filmic materials can come from many commercial sources. For instance, through the conversion of petroleum sources such as in the case of polyester, nylon and polycarbonate materials, the conversion of natural gas sources such as in the case of polyethylene, polypropylene, butadienes and other materials, natural processes such as in the case of carbohydrate polymers like cellulose derivatives, starch derivatives, polylactic acid, and polyethylene furonate. Furthermore, combinations of material sources are also use to produce thermoplastic resinous materials as a methodology to balance cost and supply issues.

In addition to the type of material used in the production of thermoplastic films, processing technology is heavily relied on to produce films with various desired properties. The properties of thermoplastic materials for films may be modified via altering the casting and stretching process. These alterations are commonly available within state of the art sequential biaxially orientation lines, blown film lines, cast and sheet extrusion lines. In the case of thermoplastic materials like polypropylene or polyethylene, low density and poorly crystalline filmic materials can be made at low extrusion casting and stretching conditions. Such materials are readily heat-sealed to other materials. However, high stretching ratios will significantly increase the crystallinity of the materials resulting in increased thermal resistance, barrier properties and solvent resistance of these same materials. It is well known in the art to vary the processing temperatures, stretching ratios, heat setting conditions, processing speeds and other machine related processes to achieved desired end-use properties.

Density is a thoroughly described attribute of polymeric materials and blends. Cavitation or admixing with miscible materials of lower bulk density may be used to reduce the density of thermoplastic filmic materials. In the case of highly oriented films, cavitation can reduce density of film. Density reduction is sought for many reasons, including because less material is utilized to make an equivalent thickness of material, thus potentially reducing cost. Furthermore, microvoiding or cavitation may produce materials of high opacity. The use of less material is additionally a desired goal of light-weighting packaging structures for potential environmental benefit.

In the case of the production of high clarity thermoplastic filmic materials with low density, the only currently available practical solution is to rely on resins that have an inherently low density. For instance, PET films can often be replaced with biaxially oriented nylon (BON) films. Nylon resin having a lower intrinsic density than PET resin will produce materials with a higher yield, or higher surface area per mass unit at an equivalent thickness. However, other attributes of PET filmic materials, such as barrier properties and thermal resistance, may need to be sacrificed to utilize the lower density BON materials.

Though transparent film materials exist, and low-density film materials exist, there remain ongoing needs for film materials that have decreased density without decreasing the transparency.

SUMMARY

Embodiments of this disclosure are directed to biaxially oriented multilayer films. The biaxially oriented multilayered films include a stack $(A-B)_n$ of n layer units A-B, where n is greater than or equal to 32 each layer unit A-B having individual layers comprising a first layer A and a second layer B overlying the first layer A. The biaxially oriented multilayer films include intralayer voids within a portion of the individual layers in the stack. The intralayer voids have width-to-height aspect ratios from 20:1 to 500:1. The first layers of the layer units have a first composition, and the second layers of the layer units have a second composition. The first composition includes a first thermoplastic and a first polymer immiscible with the first thermoplastic. The second composition includes a second thermoplastic that may be the same as or different from that of the first thermoplastic.

DETAILED DESCRIPTION

Embodiments of this disclosure include biaxially oriented multilayer films. The biaxially oriented multilayered films include a stack $(A-B)_n$ of n layer units A-B, where n is greater than or equal to 32, each layer unit A-B having individual layers comprising a first layer A and a second layer B overlying the first layer A. The biaxially oriented multilayer films include intralayer voids within a portion of the individual layers in the stack. The intralayer voids having width-to-height aspect ratios from 20:1 to 500:1. The first layers of the layer units have a first composition, the first composition comprising a first thermoplastic and a first polymer immiscible with the first thermoplastic. The second layers of the layer units have a second composition, the second composition comprising a second thermoplastic. The second thermoplastic is the same as or different from the first thermoplastic.

In various embodiments, the biaxially oriented multilayered films include a stack $(A\text{-}B)_n$ of n layer units A-B, where n is greater than or equal to 32 each layer unit A-B having individual layers comprising a first layer A and a second layer B overlying the first layer A. The biaxially oriented multilayer films include intralayer voids within a portion of the individual layers in the stack. The intralayer voids have width-to-height aspect ratios from 20:1 to 500:1. The first layers of the layer units have a first composition, and the second layers of the layer units have a second composition. The first composition includes a first thermoplastic and a voiding agent. The voiding agents create voids in the first thermoplastic. It should be understood that there are various voiding agents that may be suitable to create voids in the first thermoplastic. The second composition includes a second thermoplastic that may be the same as or different from that of the first thermoplastic.

The term "comprising" is used in the present description and claims as an open-ended term that does not exclude other non-specified elements. Unless specified otherwise, the terms "including" and "having" are equivalent to "comprising".

As used in the specification and appended claims, singular nouns preceded by an article "a," "an," or "the" are to be understood as inclusive of the plural forms, unless the context clearly indicates otherwise.

Figure 1:
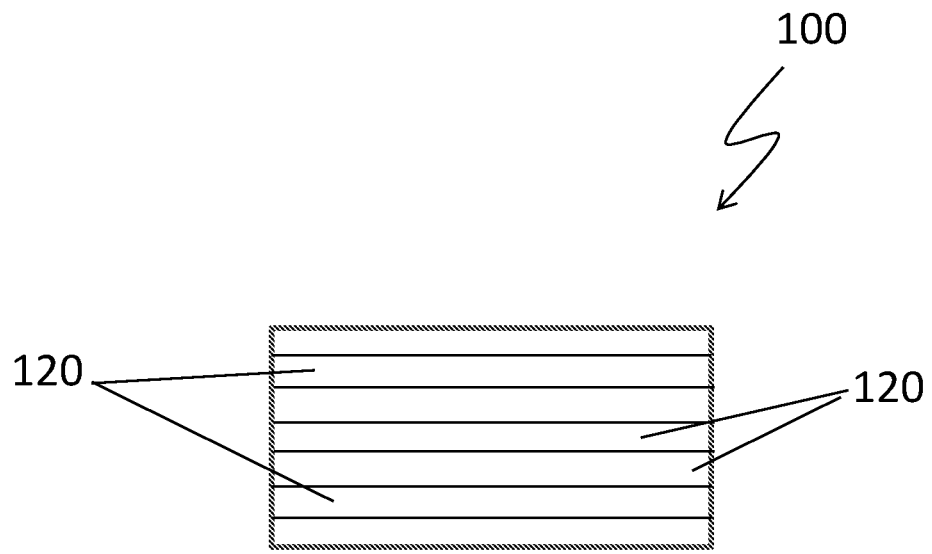
FIG. 1 is an illustrative embodiment of a stack according to one or more embodiments of this disclosure.
Figure 2:
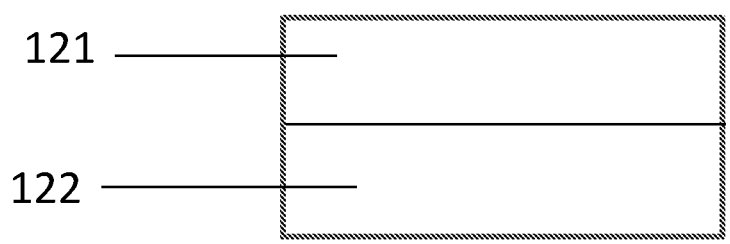
FIG. 2 is an illustrative embodiment of a unit according to one or more embodiments of this disclosure.
Figure 3:
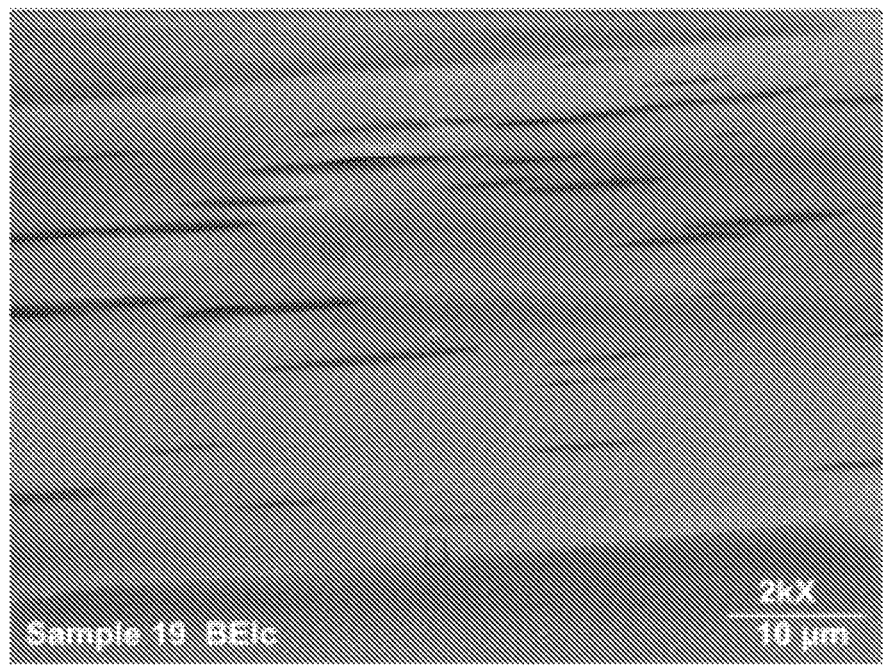
FIG. 3 is a cross-sectional SEM micrograph of a multilayer film according to an embodiment of this disclosure.
Figure 4:
FIG. 4 is a cross-sectional SEM micrograph of the multilayer film of FIG. 3.
Figure 5:
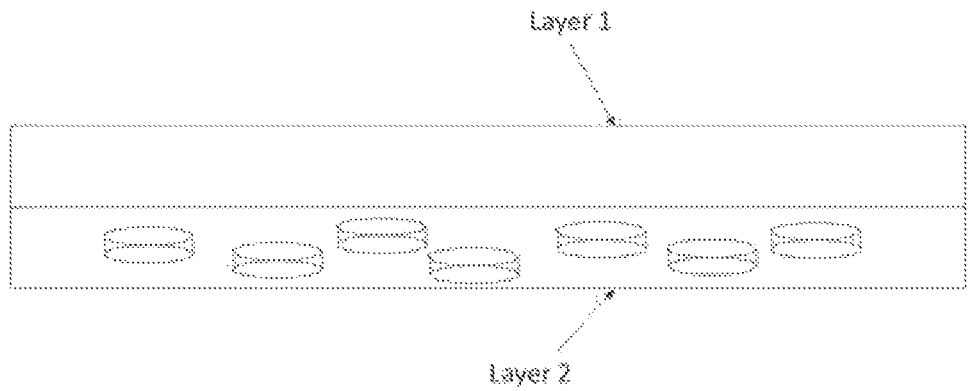
FIG. 5 is a schematic representation of intralayer voids present in multilayer films according to embodiments of this disclosure.

In embodiments, the multilayer film includes a stack. FIG. 1 provides an illustration of the stack. The stack 100 includes multiple units 120. FIG. 2 provides an illustration of the unit 120. Each unit 120 includes a first layer 121 and second layer 122.

In one or more embodiments, the first layer includes a first thermoplastic. In various embodiments, the second layer includes a second thermoplastic.

In one or more embodiments, the first thermoplastic and the second thermoplastic may be chosen from a homopolymer, a copolymer, a terpolymer of a $C_2$ to $C_8$ α-olefin, a polyamide, a polyacetate, a polyester, a polycarbonate, a polystyrene, a poly(vinyl chloride), a poly(ethylene vinyl alcohol), a poly(vinyl alcohol), a poly(ethylene vinyl acetate), a poly(acrylic acid) and a poly(ethylene terephthalate) or a blend or mixture of any of the foregoing materials. In some embodiments, the first thermoplastic, the second thermoplastic, or both, is a polypropylene-based homopolymer or copolymer. In other embodiments, the first thermoplastic, the second thermoplastic, or both, is a polyethylene-based homopolymer or copolymer (e.g. an LLDPE).

In various embodiments, the first thermoplastic may include polyethylene terephthalate (PET). In some embodiments, second thermoplastic may include PET, and in one or more embodiments, the first thermoplastic and the second thermoplastic may include PET.

In some embodiments, the first thermoplastic includes polybutylene terephthalate (PBT). In some embodiments, second thermoplastic includes PBT, and in one or more embodiments, the first thermoplastic and second thermoplastic both include PBT.

In some embodiments, the first thermoplastic includes PET, and the second thermoplastic includes PBT.

In embodiments of the biaxially oriented multilayer film, the first composition further includes a first polymer immiscible with the first thermoplastic. In some embodiments, the second composition may further include a second polymer immiscible with the second thermoplastic, where the second polymer may be the same as or different from the first polymer. The first polymer may be chosen from polymers having a density less than the density of the first thermoplastic. The second polymer, when present, may be chosen from polymers having a density less than the density of the second thermoplastic.

In one or more embodiments of the biaxially oriented multilayer film, the first polymer may include one or more cycloolefin polymers. The cycloolefin polymers may be homopolymers or copolymers that contain polymerized cycloolefin units and, optionally, acyclic olefin comonomers. Suitable cycloolefin polymers include 0.1% to 100% by weight cycloolefin units, or from 10% to 99% by weight cycloolefin units, or from 50% to 95% by weight cycloolefin units, based in each case on the total mass of the cycloolefin polymer. In some embodiments, the cycloolefin polymers may have a structure according to any one of Formulas I, II, III, IV, V, or VI:

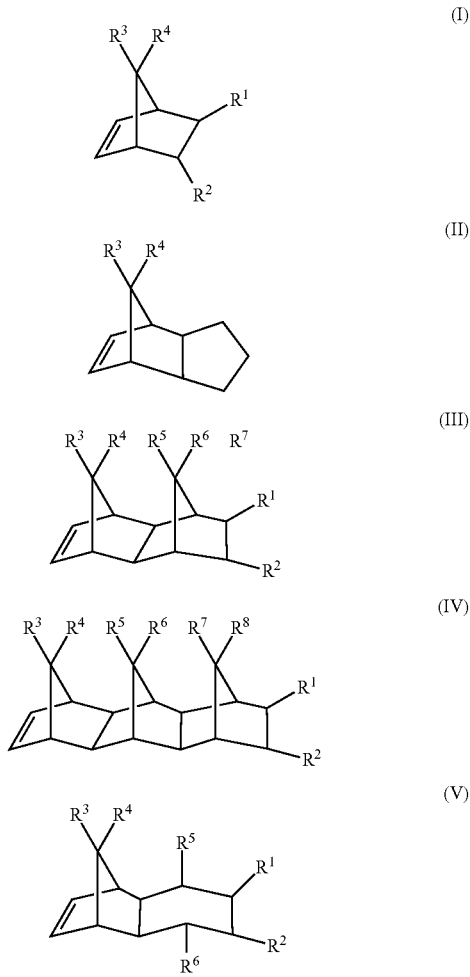

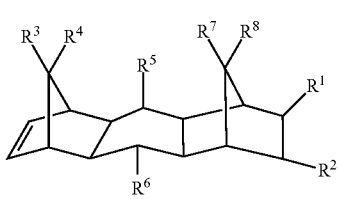

(VI)

In formulas (I), (II), (III), (IV), (V), and (VI), $R^1$, $R^2$, $R^3$, $R^4$, $R^5$, $R^6$, $R^7$ and $R^8$ are identical or different and independently of one another denote a hydrogen atom or a $(C_1-C_{30})$hydrocarbyl. The term "hydrocarbyl" refers to a hydrocarbon radical. Optionally, any two or more of the radicals $R^1$ to $R^8$ in any of formulas I-VI may be joined cyclically to one another. Examples of $(C_1-C_{30})$hydrocarbyl radicals include linear or branched $(C_1-C_8)$alkyl, $(C_6-C_{18})$aryl, $(C_7-C_{20})$alkylenearyl, and $(C_3-C_{20})$cycloalkyl. The term "alkyl" refers to a branched alkane radical or an unbranched alkane radical. The term "aryl" refers to an aromatic ring structure having a radical on a carbon atom of the aromatic ring. The term "alkylenearyl" refers to a alkyl-aromatic structure having a radical on a carbon of the alkyl group.

The cycloolefin polymers may contain from 0% to 45% by weight, based on the total mass of the cycloolefin polymer, of polymerized units of at least one monocyclic olefin of the formula VII:

(VII)

In formula (VII), n is an integer from 3 to 10.

The cycloolefin polymers may further contain from 0% to 99% by weight, based on the total mass of the cycloolefin polymer, of polymerized units of an acyclic olefin of the formula VIII:

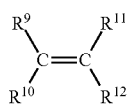

(VIII)

In formula (VIII), $R^9$, $R^{10}$, $R^{11}$, and $R^{12}$ are independently selected from a hydrogen atom (—H), $(C_1-C_{10})$hydrocarbyl, $(C_1-C_8)$alkyl, or $(C_6-C_{14})$aryl.

Likewise suitable in principle are cycloolefin polymers obtained by ring-opening polymerization of at least one of the monomers of the formulas I to VI and subsequent hydrogenation.

Cycloolefin homopolymers are synthesized from one monomer of any of the formulas (I) to (VI).

The fraction of polymerized units of acyclic olefins of the formula VIII is up to 99% by weight, from 5% to 80% by weight, or from 10% to 60% by weight, based on the total weight of the respective cycloolefin copolymer.

In various embodiments, the cycloolefin copolymers (COCs) include polymerized units of polycyclic olefins of formula (VIII), where one of $R^9$, $R^{10}$, $R^{11}$, and $R^{12}$ is a cyclohydrocarbyl with a norbornene parent structure of formula (I). In some embodiments, the COC includes polymerized units of norbornene or tetracyclododecene, formula (III), where $R^1$, $R^2$, $R^3$, $R^4$ $R^5$, $R^6$, and $R^7$ are hydrogen.

In other embodiments, the first polymer includes COCs containing polymerized units of acyclic olefins such as ethylene. In some embodiments, the first polymer includes norbornene/ethylene and tetracyclododecene/ethylene copolymers containing from 5% to 80% by weight ethylene units, or from 10% to 60% by weight ethylene units, based on the weight of the copolymer.

The COCs may include compounds prepared by heterogeneous or homogeneous catalysis with organometallic compounds, according to any known synthetic route. Suitable catalyst systems based on cocatalysts of titanium compounds and/or vanadium compounds in conjunction with aluminum organyls.

The cycloolefin copolymers may be incorporated into the biaxially oriented multilayer film as a starting material in the form either granules or a granulated concentrate as is well known in the art. The polyester granules, and any further components are for this purpose premixed, and then the premix is supplied to the extruder. Within the extruder, the components undergo further mixing and are heated to processing temperature. For the preparation process of the invention it is advantageous for the extrusion temperature to be well above the glass transition temperature Tg of the cycloolefin copolymer (COC); generally at least 30° C., from 40° C. to 230° C., or from 50° C. to 200° C. above the glass transition temperature of the cycloolefin copolymer (COC).

In various embodiments, the first composition comprises from 0.5% to 10% by weight first polymer, based on the total weight of the first composition. In one or more embodiments, the first composition comprises from 0.5% to 5% by weight of the first polymer, based on the total weight of the first composition.

In some embodiments, the first composition includes from 80% to 95% by weight PET as the first thermoplastic and from 5% to 20% COC as the first polymer, based on the total weight of the first composition; and the second composition includes from 80% to 100% by PET as the second thermoplastic and from 0% to 20% COC as the second polymer, based on the total weight of the second composition.

In embodiments of the biaxially oriented multilayer film, the first composition comprises from 80% to 95% by weight PET as the first thermoplastic and from 20% to 5% PBT as the first polymer, based on the total weight of the first composition; and the second composition includes from 80% to 100% by weight of PET as the second thermoplastic and from 0% to 20% PBT as the second polymer, based on the total weight of the second composition. In some embodiments, the first composition comprises from 85% to 95% by weight PET as the first thermoplastic and from 15% to 5% PBT as the first polymer or from 90% to 95% by weight PET as the first thermoplastic and from 10% to 5% PBT as the first polymer based on the total weight of the first composition. In various embodiments, the second composition includes from 90% to 100% by weight of PET as the second thermoplastic and from 0% to 10% PBT as the second polymer, based on the total weight of the second composition.

In one or more embodiments, the biaxially oriented multilayer film has a bulk haze of less than or equal to 20%, as measured by ASTM D 1003. The term "bulk haze" refers to the percentage of incident incandescent light that is transmitted through a film that is deflected or scattered more than 2.5 degrees from the incoming light direction. On the other hand, the term "light transmission" refers to percentage of incident light that passes through a film. The bulk haze of a biaxially oriented multilayer film may be measured with a spectrophotometer or haze meter using ASTM method D 1003. In one or more embodiments, the bulk of the biaxially oriented multilayer film is less than or equal to 20%. In other embodiments, the haze is less than or equal to 18%, less than or equal to 15%, less than or equal to 12%, less than or equal to 10%, less than or equal to 8%, less than or equal to 5%, less than or equal to 3%, or less than or equal to 2%.

The biaxially oriented multilayer films include intralayer voids within a portion of the individual layers in the stack. The intralayer voids in the biaxially oriented multilayer film comprise the first polymer that is immiscible with the first thermoplastic. Since the first polymer is immiscible with the first thermoplastic, the first polymer forms voids within the thermoplastic polymer, in which there is an absence of the thermoplastic polymer. The voids formed from the first polymer immiscible with the first thermoplastic become an intralayer void once the desired number of units A-B are formed. An intralayer void is a void that is confined to a single layer, such as the first layer A or the second layer B or a single unit A-B.

In one or more embodiments of the biaxially oriented multilayer film, the intralayer voids have heights greater than 0 and less than 0.4 µm. In some embodiments, the intralayer voids have heights greater than 0 and less than 0.3 µm. When the height of the intralayer void in less than the wavelength range of visible light, it is believed that the biaxially oriented multilayer film has less bulk haze and, in turn, greater transmittance of visible light, than when the intralayer voids have a height greater than the wavelength range of visible light.

In one or more embodiments of the biaxially oriented multilayer film, the intralayer voids have width-to-height aspect ratios from 20:1 to 500:1. In some embodiments, the intralayer voids have width-to-height aspect ratios from 100:1 to 500:1. In further embodiments, the intralayer voids have width-to-height aspect ratios from 250:1 to 500:1.

Figure 6:
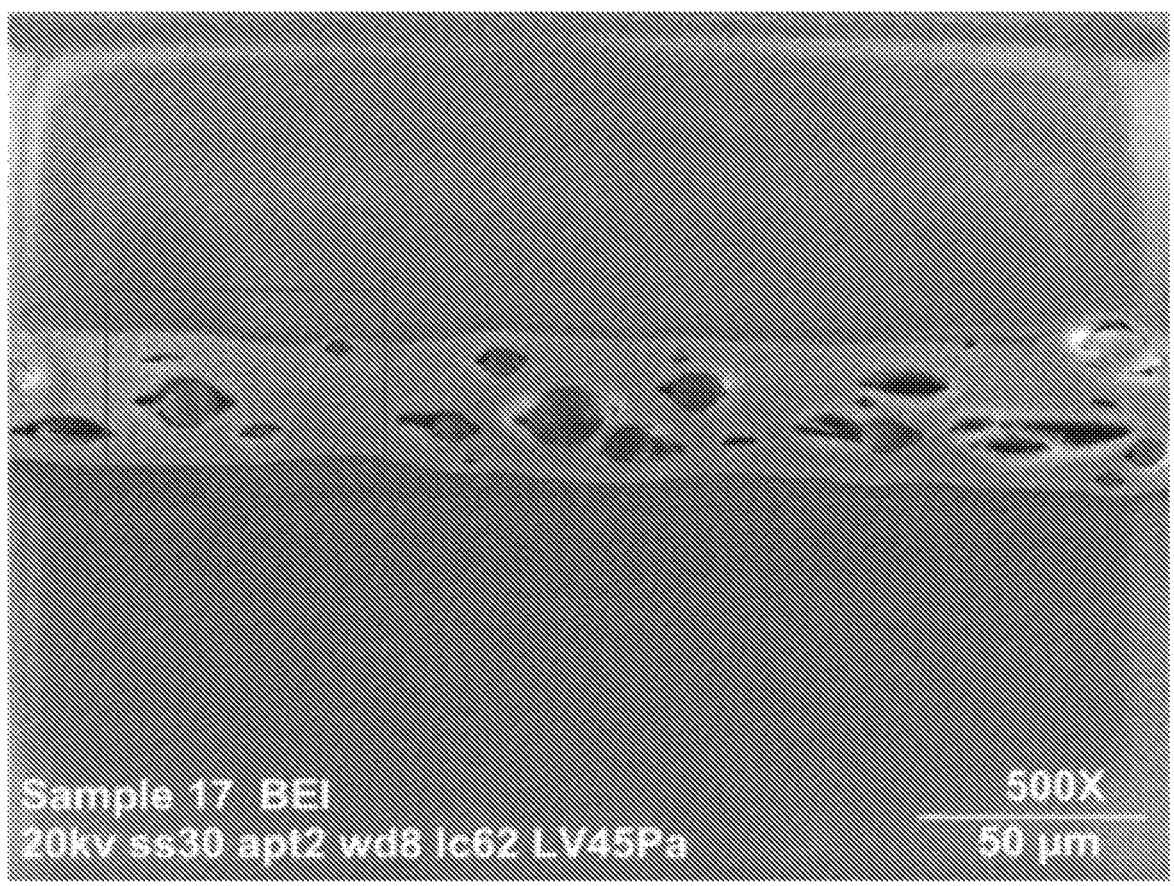
FIG. 6 is an SEM micrograph of a multilayer film prepared as a comparative example to multilayer films according to embodiments of this disclosure.

FIG. 6 is an SEM micrograph of a multilayer film prepared as a comparative example. The comparative example of FIG. 6 is a single layer film that includes an immiscible polymer and a thermoplastic. The immiscible polymer forms voids in the thermoplastic. The voids in the comparative example have a height greater than 0.4 µm.

In one or more embodiments, the stack includes multiple units $(A-B)_n$, in which n described the number of layers of A-B units. In some embodiments, subscript n of $(A-B)_n$ is greater or equal to 50. In some embodiments, n is from 55 to 600, from 100 to 550, or from 200 to 550. For example, when subscript n of $(A-B)_n$ is 50, and there is only a first layer A and a second layer B in the unit A-B, then the stack will comprises 100 individual layers, in which there is an ABAB repeating pattern. In one or more embodiments, the unit A-B comprises three layers, such the stack has a repeating pattern of ACB, AAB, or ABB, in which C is a third thermoplastic.

In one or more embodiments, at 260° C., the first composition has a first melt viscosity $\eta_1$ and the second composition has a second melt viscosity $\eta_2$, where $|\eta_1-\eta_2|/\eta_1$ is from greater than 0 to less than or equal to 0.2. In some embodiments, $|\eta_1-\eta_2|/\eta_1$ is from greater than 0 to 0.10, from 0.01 to 0.1, from 0.01 to 0.05, or from 0.001 to 0.02. Extensive interlayer variation of viscosities are well known to give layer flow instabilities in multilayer systems. Flow instabilities can result in poor thickness profile in the cross or machine direction in a typical filmic process. It is necessary to manage viscosity profiles properly in order to maintain the film flatness within the multilayer process.

Without intent to be bound by any particular theory, it is believed that two polymers or two blends of polymers should have a relatively small differences in melt viscosity, such as with 5% relative viscosity at typical extrusion melt conditions and appropriate shear rates of approximately 10 to 100 $s^{-1}$, are capable of creating the biaxially oriented multilayer film with low density and low haze. The relatively small difference in viscosities restrict the layers from mixing when the polymer or polymer blends are in a molten state (such that the polymer temperature is greater the melt temperature of the polymer or polymer blend). The relatively small difference in viscosity allows the two polymers or polymer blends to be split and stacked to form a stack of A-B units. The splitting and stacking may occur multiple times to form 16, 32, 64, 128, 256, 512 or 1024 individual layers of A-B repeating layers. When a desired number of layers is reached, the melt is pushed through an extrusion die and cast onto a water-cooled roller and wound on a rotating core or passed on for further processing as a thick plastic film. Materials with differences in melt viscosities greater than 5% at similar melt temperatures may exhibit rheological stresses between the individual sub-micron layers. The stresses may deform and distress the voiding structures and cause agglomerates to form, thereby increasing the bulk haze of the film.

There are various methods to produce multilayer films. An example of one method of forming a multilayer film includes combining two separate melt streams to form a double-layered system. The double layered system is passed through feed blocks that divide the double-layered system perpendicular to a stacking plane. The divided double-layered system is guided vertically apart and passed through a die flattening them and stacking them on top of each other. This effectively doubles the number of alternating layers. Multiple feed blocks may be added in series to double the amount of layers each time they pass through one. Examples of this technique can be found in U.S. Pat. Nos. 3,557,265; 3,565,985; 3,759,647; 5,380,479; 3,328,003; 3,565,985; 3,479,425; and U.S. pre-grant publication 2012/0288696.

All numerical ranges of this disclosure, for example "from 1 to 10" are to be understood as disclosing all individual values in the ranges, as well as all subranges in the ranges, as separate embodiments. For example, the range "from 1 to 10" discloses as separate embodiments every individual value from 1 to 10, inclusive of 1 and 10, as well as subranges including, but not limited to "from 5 to 10", "from 2 to 8" "from 5 to 8" and "from 3 to 9".

EXAMPLES

It should be understood that Examples 1-7 are provided to illustrate embodiments described in this disclosure and are not intended to limit the scope of this disclosure or its appended claims. Examples 1-3 are prepared by Method A, in which each example has a different number of layers. In Method A, the films that were produced had layer of A/B/A/B, in which layer A was PET and layer B was PET/COC. Examples 4-6 were prepared by Method B, in which each examples has a different number of layers of AB/AB. In Method B, films were prepared, in which layer A was PET/COC and layer B was PET/COC. Example 7 was prepared by Method C, in which the film produced from Method C included PET and PET/PBT layers.

Method A—Preparation of Examples 1-3

A multi-layer thermoplastic film was prepared by extruding a stack of A-B units of thermoplastic materials. The thermoplastic materials included a layer of PET and another layer of PET admixed with 10% by weight of COC. After casting the film was oriented with a Karo IV off-line film stretcher. This equipment is commercially available from Brukner Incorporated. The polyester resin chosen had an intrinsic viscosity (IV) of 0.69 and was purchased commercially from Polyquest Industries as Grade PCQ69. The COC chosen was manufactured by Topas as grade 5013-F. Before extrusion, the PET resins were dried to remove moisture in order to maintain the extrusion melt strength. Although not necessary, polyethylene capping layers were extruded on both sides of the doublet stack in order to enhance melt-flow in the test.

The cast multilayer film is then stretched in both major axes directions through one of two methods; off-line or in-line stretching and orientation. In the case of small scale off-line stretching, such a method is convenient for testing and evaluation of new film formulations. In this case, squares of film can be oriented either simultaneously or sequentially by a system of mechanically linked clamps inside an oven (as in the Bruckner Karo IV test machine).

On line stretching: the cast film was first heated and stretched in the machine direction by pairs of rollers. Generally, the film was held under pressure or nipped, between the rollers. The second set of rollers rotate 2 to 4 times faster than the first so the cast film is drawn out into a longer and thinner web moving at a higher speed. The film was moved into a static oven where pairs of clips mounted to moving chains continuously capture the film edges and were forced apart after a short heating time. As the chains were forced apart the width of film increases by a factor of 3 to 4 and the film thins by the same value. This two axis stretching increases the strength of film dramatically typically through strain induced crystallization of the polymeric materials in the film.

The layer film of Example 1 was prepared by a co-extrusion described in Method A then followed by 9 square mixing elements.

The layer film of Example 2 was prepared by a co-extrusion described in Method A followed by 8 square mixing elements.

The layer film of Example 3 was prepared by a co-extrusion described in Method A followed by 7 square mixing elements.

Method B—Preparation of Examples 4-6

When preparing the multilayer films of Examples 4 to 6, the multi-layer thermoplastic films were prepared by extruding a doublet stack of thermoplastic materials consisting of a layer of PET admixed with 8% COC and another layer of PET admixed with 10% by weight of COC. After casting the film was oriented with a Karo IV off-line film stretcher. The polyester resin chosen had an intrinsic viscosity (IV) of 0.69 and was purchased commercially from Polyquest Industries as Grade PCQ69. The COC chosen was manufactured by Topas as grade 5013-F. Before extrusion, the PET resins were dried to remove moisture in order to maintain the extrusion melt strength. Although not necessary, polyethylene capping layers were extruded on both sides of the doublet stack in order to enhance melt-flow in the test.

The layer film of Example 4 was prepared by a co-extrusion described in Method B then followed by 9 square mixing elements.

The layer film of Example 5 was prepared by a co-extrusion described in Method B followed by 8 square mixing elements.

The layer film of Example 6 was prepared by a co-extrusion described in Method B followed by 7 square mixing elements.

Method C—Preparation of Example 7

The multilayered film of Example 7 was prepared by extruding a doublet stack of thermoplastic materials of a layer of PET and another layer of PET admixed with 10% by weight of polybutylene terephthalate (PBT). The PBT chose had a similar melt viscosity to PET and was supplied by Dupont a. After casting the film was oriented with a Karo IV off-line film stretcher. The polyester resin chosen had an intrinsic viscosity (IV) of 0.69 and was purchased commercially from Polyquest Industries as Grade PCQ69. Before extrusion, the PET resins were dried to remove moisture in order to maintain the extrusion melt strength. Although not necessary, polyethylene capping layers were extruded on both sides of the doublet stack in order to enhance melt-flow in the test.

The layer film of Example 7 was prepared by a co-extrusion according to Method C followed by 8 square mixing elements.

Comparative Example C1

The multilayered film of Comparative example C1 was prepared by extruding a doublet stack of thermoplastic materials consisting of a layer of PET and another layer of PET admixed with 10% by weight of PBT and Calcium Carbonate. The PBT/Calcium carbonate master batch is commercially available from many sources. After casting the film was oriented with a Karo IV off-line film stretcher. The polyester resin chosen had an intrinsic viscosity (IV) of 0.69 and was purchased commercially from Polyquest Industries as Grade PCQ69. Before extrusion, the PET resins were dried to remove moisture in order to maintain the extrusion melt strength. Although not necessary, polyethylene capping layers were extruded on both sides of the doublet stack in order to enhance melt-flow in the test.

The Comparative example C1 film was prepared by a co-extrusion followed by 8 square mixing elements.

Comparative Example C2

A multi-layer thermoplastic film was prepared by extruding a doublet stack of thermoplastic materials consisting of a layer of PET and another layer of PET admixed with 10% by weight of polypropylene. A series of square mixers followed the melt stream and the resinous materials were casted onto a chilled roll. After casting, the film was oriented with a Karo IV off-line film stretcher. The polyester resin chosen had an intrinsic viscosity (IV) of 0.69 and was purchased commercially from Polyquest Industries as Grade PCQ69. The PP chosen (Pinnacle 1703). Before extrusion, the PET resins were dried to remove moisture in order to maintain the extrusion melt strength. Although not necessary, Polyethylene capping layers were extruded on both sides of the duplet stack to assist in drawing the polymer melt from the die.

The layer film of Comparative C2 was prepared by co-extrusion as described in E, followed by 7 square mixing elements. Very high haze was seen with this sample. SEM analysis of the layer structure shows the PP resin crosses the interfacial boundaries of the 254 multilayer stack not resulting in the circular voids needed for high clarity with low density.

Comparative Example C3

A monolayer film containing 92% PET with an IV of 0.62 was admixed with 8% by weight of COC. The extrusion cast and quenched material was oriented in the MD direction and TD direction by conventional methods as described in U.S.

Pat. Nos. 9,580,798 and 10,131,122. High haze and high opacity was noted along with reduced film density.

Comparative Example C4

A three layer film was prepared containing virgin PET as per conventional methods described in U.S. Pat. No. 9,580,798 and US application 1013/001122.

The properties of Inventive Examples 1 to 7 and Comparative examples C1 to C4 are reported in Table 1.

TABLE 1

Multilayer Film Data

| Example | No. of Layers | Material of Layer A | Material of Layer B | Bulk Haze | Density g/cm$^2$ |
|---|---|---|---|---|---|
| Example 1 | 1024 | PET | PET/COC | 10.6 | 1.20 |
| Example 2 | 512 | PET | PET/COC | 6.17 | 1.06 |
| Example 3 | 254 | PET | PET/COC | 8.02 | 1.06 |
| Example 4 | 1024 | PET/COC | PET/COC | 16.5 | 1.14 |
| Example 5 | 512 | PET/COC | PET/COC | 6.67 | 1.25 |
| Example 6 | 254 | PET/COC | PET/COC | 10.3 | 1.18 |
| Example 7 | 512 | PET | PBT/PET | 1.63 | 1.36 |
| Comparative C1 | 512 | PET | PBTVA/PET | 55.3 | 1.17 |
| Comparative C2 | 254 | PET | PP/PET | 92.2 | 0.86 |
| Comparative C3 | 1 | PET/COC | N/A | 86 | 1.23 |
| Comparative C4 | 3 | PET | PET | 4 | 1.41 |

The multilayer films of Examples 1 to 7 had at least 512 layers and a bulk haze of less than 20. The multilayer films of Examples 1 to 7 had a densities less than 1.40 g/cm$^2$. Though the multilayer film of Comparative C1 had a low density of 1.17 g/cm$^2$, its bulk haze was 55.3, and the film was opaque. Similarly, though the multilayer film of Comparative C2 had a low density of 0.86 g/cm$^2$, it too had a large bulk haze of 92.2, greater than the bulk haze of the multilayer film of Comparative C1.

The film of Comparative C3 was a single layered film. While the density was low, measuring 1.23 g/cm$^2$, the bulk haze of the single layer film was high, measuring at 86. In contrast, the multilayer film of Comparative C4, a trilayer film, had good optical quality having a bulk haze of 4, but the density of the film was greater than 1.40 g/cm$^2$, specifically 1.41 g/cm$^2$.

Measurement Methods

Measurements of haze can be done as is well known in the art such as with ASTM D1003 or equivalent techniques. Density can be measured by any of well-known methods such as ASTM D792 or through the use of helium or nitrogen pycnometery.

The invention claimed is:

1. A biaxially oriented multilayer film comprising:
a stack (A-B)$_n$ of n layer units A-B, where n is greater than or equal to 32, each layer unit A-B having individual layers comprising a first layer A and a second layer B overlying the first layer A; and
intralayer voids within a portion of the individual layers in the stack, the intralayer voids having width-to-height aspect ratios from 20:1 to 500:1, wherein:
the first layers of the layer units have a first composition, the first composition comprising a first thermoplastic and a first polymer immiscible with the first thermoplastic; and the second layers of the layer units having a second composition, the second composition comprising a second thermoplastic; and
the second thermoplastic is the same as or different from the first thermoplastic, wherein the biaxially oriented multilayer film has a bulk haze of less than 20, as measured by ASTM D1003.

2. The biaxially oriented multilayer film of claim 1, wherein, at 260° C., the first composition has a first melt viscosity $\eta_1$ and the second composition has a second melt viscosity $\eta_2$, where $|\eta_1-\eta_2|/\eta_1$ is from greater than 0 to less than or equal to 0.2.

3. The biaxially oriented multilayer film of claim 1, wherein the first composition comprises from greater than 0 to 10% by weight first polymer, based on the total weight of the first composition.

4. The biaxially oriented multilayer film of claim 1, comprising at least 250 layer units.

5. The biaxially oriented multilayer film of claim 1, comprising at least 500 layer units.

6. The biaxially oriented multilayer film of claim 1, comprising at least 1000 layer units.

7. The biaxially oriented multilayer film of claim 1, wherein the first thermoplastic is polyethylene terephthalate (PET).

8. The biaxially oriented multilayer film of claim 1, wherein the first thermoplastic and the second thermoplastic are polyethylene terephthalate (PET).

9. The biaxially oriented multilayer film of claim 1, wherein the first polymer comprises a cyclo-olefinic copolymer (COC) or polybutyleneterephthalate (PBT).

10. The biaxially oriented multilayer film of claim 1, wherein the second composition further comprises a second polymer immiscible with the second thermoplastic.

11. The biaxially oriented multilayer film of claim 10, wherein:
the first composition comprises from 80% to 95% by weight polyethylene terephthalate (PET) and from 5% to 20% by weight cyclo-olefinic copolymer (COC), based on the total weight of the first composition; and
the second composition comprises from 80% to 100% by weight PET and from 0% to 20% by weight COC, based on the total weight of the second composition.

12. The biaxially oriented multilayer film of claim 10, wherein:
first composition comprises from 80% to 95% by weight polyethylene terephthalate (PET) and from 5% to 20% by weight polybutyleneterephthalate (PBT), based on the total weight of the first composition; and
the second composition comprises from 80% to 100% by weight PET and from 0% to 20% by weight PBT, based on the total weight of the second composition.

13. The biaxially oriented multilayer film of claim 10, wherein intralayer voids have heights less than 500 nm.

* * * * *